United States Patent [19]
Kawai

[11] Patent Number: 6,084,441
[45] Date of Patent: Jul. 4, 2000

[54] APPARATUS FOR AND METHOD OF PROCESSING DATA

[75] Inventor: Shuichi Kawai, Kanagawa, Japan

[73] Assignee: NEC Corporation, Tokyo, Japan

[21] Appl. No.: 08/900,279

[22] Filed: Jul. 25, 1997

[30] Foreign Application Priority Data

Jul. 30, 1996 [JP] Japan ................................. 8-200733

[51] Int. Cl.⁷ ................................................... H03K 1/04
[52] U.S. Cl. ........................... 327/99; 327/115; 327/117; 327/292; 327/294; 327/298; 377/20; 377/47
[58] Field of Search ............................. 327/99, 115, 117, 327/292, 294, 298; 377/47, 20

[56] References Cited

U.S. PATENT DOCUMENTS

| | | | |
|---|---|---|---|
| 4,023,109 | 5/1977 | Shreve | 328/75 |
| 5,027,298 | 6/1991 | Khazam | 364/569 |

FOREIGN PATENT DOCUMENTS

| | | |
|---|---|---|
| 317748 | 1/1991 | Japan . |
| 4348410 | 3/1992 | Japan . |
| 4158419 | 6/1992 | Japan . |
| 4-250715 | 9/1992 | Japan . |
| 5289786 | 5/1993 | Japan . |
| 7-15237 | 1/1995 | Japan . |
| 62262165 | 11/1997 | Japan . |

*Primary Examiner*—Margaret R. Wambach
*Attorney, Agent, or Firm*—Sughrue, Mion, Zinn, Macpeak & Seas, PLLC

[57] ABSTRACT

A data processing apparatus functions as a timer or counter by counting clock pulses of a system clock signal to generate a timing signal. The system clock signal is generated as one of either a first or a second basic clock signal generated by two respective oscillators. Even if the second basic clock signal which has a lower frequency fluctuates, the data processing apparatus can accurately generate a pulse signal having a desired period. When the first basic clock signal is selected as the system clock signal, the second basic clock signal is measured with the system clock signal. When the second basic clock signal is selected as the system clock signal, a numerical value up to which the clock pulses of the system clock signal are counted is corrected on the basis of the measured second basic clock signal.

8 Claims, 7 Drawing Sheets

APPARATUS FOR AND METHOD OF PROCESSING DATA

BACKGROUND OF THE INVENTION

1. Field of the Invention

The present invention relates to an apparatus for and a method of processing data as a timer or counter by selecting one of either a first basic clock signal generated by a first clock generator or a second basic clock signal generated by a second clock generator as a system clock signal and counting clock pulses of the system clock signal up to a predetermined numerical value thereby to generate a timing signal.

2. Description of the Related Art

Heretofore, clock generators for generating basic clock signals for data processing apparatus generally include a quartz-crystal oscillator and an RC (resistance-capacitance) oscillator. The quartz-crystal oscillator is better than the RC oscillator with respect to oscillation accuracy. However, the RC oscillator is cheaper and takes up a smaller installation space than the quartz-crystal oscillator as the quartz-crystal oscillator needs an expensive quartz resonator and requires a larger installation area.

One data processing apparatus has both a quartz-crystal oscillator and an RC oscillator, and employs the quartz-crystal oscillator when higher oscillation accuracy is required and employs the RC oscillator when a clock timer operates at a low rate that does not require high oscillation accuracy.

FIG. 1 of the accompanying drawings shows such a conventional data processing apparatus. As shown in FIG. 1, the data processing apparatus comprises a microcomputer 101 having a quartz-crystal oscillator 11 and an RC oscillator 12. The quartz-crystal oscillator 11 generates a first basic clock signal having a higher frequency, and the RC oscillator 12 generates a second basic clock signal having a lower frequency.

These oscillators 11, 12 are connected to a clock selector 13 that is connected to a clock timer 14. The clock selector 13 and the clock timer 14 are connected to a bus 15 to which there are connected a data processing circuit 16 and an external terminal control circuit 17.

The data processing circuit 16 has a CPU (Central-Processing Unit) 18, a ROM (Read-Only Memory) 19, and a RAM (Random-Access Memory) 20. The external terminal control circuit 17 is connected to an external terminal 21 for receiving signals from and transmitting signals to an external circuit.

The ROM 19 stores software such as a control program for the CPU 18. The RAM 20 has a work area for temporarily storing data processed by the CPU 18. According to signals supplied from the external terminal 21 and the control program stored in the ROM 19, the CPU 18 executes various data processing modes while using the work area of the RAM 20 for thereby controlling the clock selector 13 and the clock timer 14.

When controlled by the data processing circuit 16, the clock selector 13 selectively outputs either the first or the second basic clock signals as a system clock signal. Clock pulses of the system clock supplied from the clock selector 13 are repeatedly counted by the clock timer 14 up to a predetermined numerical value which has been established in advance by the data processing circuit 16. Each time the clock timer 14 counts clock pulses up to the predetermined numerical value, the external terminal control circuit 17 generates a pulse signal as a timing signal.

If the microcomputer 101 functions as a timer, for example, pulse signals generated by the external terminal control circuit 17 are transmitted from the external terminal 21 to external circuits. If the microcomputer 101 functions as a counter, for example, various signals supplied from external circuits to the external terminal 21 are counted by pulse signals generated by the external terminal control circuit 17. The system clock signal is also supplied directly to the CPU 18, the ROM 19, and the RAM 20 of the data processing circuit 16 for use as a reference clock signal for the CPU 18, the ROM 19, and the RAM 20.

The data processing apparatus shown in FIG. 1 is capable of generating pulse signals having various frequencies with respect to control data supplied from the external terminal 21 to the external terminal control circuit 17. For example, if the system clock signal supplied to the clock timer 14 has a frequency of 1 KHz and a period of 1 msec., then in order to output a high-level pulse signal having a period of 60 msec. to the external terminal 21, the data processing circuit 16 establishes a numerical value of 60 up to which the clock timer 16 counts clock pulses.

The data processing circuit 16 first clears the count of the clock timer 14, and then controls the external terminal control circuit 17 to output a low-level signal and then a high-level signal. At the same time, the data processing circuit 16 controls the clock timer 14 to start counting system clock pulses, and controls the external terminal control circuit 17 to output a low-level signal to the external terminal 21 each time the count of the clock timer 14 reaches the numerical value of 60. Since the signal outputted from the external terminal 21 changes from a high level to a low level at the period of 60 msec., the data processing apparatus outputs a pulse signal having the period of 60 msec.

If higher accuracy is required for counting system clock pulses to produce the above pulse signal, then the first basic clock signal generated by the quartz-crystal oscillator 11 is used as the system clock signal. On the other hand, if an energy saving requirement has to be met, then the second basic clock signal generated by the RC oscillator 12 is used as a system clock signal.

The frequencies of the basic clock signals generated by the oscillators 11, 12 have been determined beforehand, and numerical values up to which clock pulses are counted are established on the basis of these predetermined frequencies. The RC oscillator 12 is used in occasions where higher accuracy is not required for pulse signals. However, the accuracy of the generated pulse signal may occasionally be lowered below a tolerable range.

Specifically, the frequency of the basic clock signal generated by the RC oscillator 12 tends to vary greatly from an ideal value due to manufacturing error, operating voltage, ambient temperature, etc. of the resistor and capacitor of the RC oscillator 12, unduly lowering the accuracy of the generated pulse signal. For example, if the period of the second basic clock signal generated by the RC oscillator 12 varies from an ideal value of 1.0 msec. to 1.2 msec. due to a change in the resistance or capacitance of the RC oscillator 12, then the period of the pulse signal increases from 60 msec. to 72 msec.

In order to increase the pulse signal accuracy of the RC oscillator, it has been proposed to add a built-in variable component circuit for adjusting the resistance or capacitance of the RC oscillator in a data processing apparatus disclosed in Japanese laid-open patent publication No. 7-15237. If such a built-in variable component circuit is fabricated as a general MOS (Metal Oxide Semiconductor), the data processing apparatus will necessarily increase in size as the built-in variable component circuit cannot be manufactured in a small size.

SUMMARY OF THE INVENTION

It is therefore an object of the present invention to provide a data processing apparatus which will function as a timer or counter using a timing signal selected by switching between the first and second basic clock signals, and capable of functioning highly accurately as a timer or a counter even when the second basic clock signal, which is lower in frequency than the first basic clock signal, is selected.

Another object of the present invention to provide a method of processing data which can be carried out by such a data processing apparatus.

According to a first aspect of the present invention, there is provided an apparatus for processing data, comprising first clock generating means for generating a first basic clock signal, second clock generating means for generating a second basic clock signal lower in frequency than the first basic clock signal, clock selecting means for selectively outputting the first basic clock signal and the second basic clock signal as a system clock signal, timing generating means for counting clock pulses of the system clock signal up to a predetermined numerical value thereby to generate a timing signal, and data processing means for measuring the second basic clock signal with the system clock when the first basic clock signal is selected as the system clock signal, and correcting the predetermined numerical value based on the measured second basic clock signal when the second basic clock signal is selected as the system clock signal.

With the first aspect of the present invention, as described above, the second basic clock signal is measured with the first basic clock signal, and the predetermined numerical value up to which the clock pulses are counted is corrected when the second basic clock signal is selected as the system clock signal. Even when the second basic clock signal varies from an ideal value therefor, the time required to count the clock pulses up to the predetermined numerical value can be corrected at the ideal value.

Japanese laid-open patent publication No. 4-250715 discloses a data processing apparatus which also measures a second basic clock signal with a first basic clock signal. In the disclosed data processing apparatus, the time of a period of a signal from an external RC oscillator is measured with a basic clock signal generated by an internal quartz-crystal oscillator, and only when the data processing apparatus is in a sleep mode, the measured time is added in every period of the signal from the external RC oscillator. However, since the time is measured when the data processing apparatus is in the sleep mode, the data processing apparatus is only capable of measuring the time.

According to a second aspect of the present invention, there is provided an apparatus for processing data, comprising first clock generating means for generating a first basic clock signal, second clock generating means for generating a second basic clock signal lower in frequency than the first basic clock signal, clock selecting means for selectively outputting the first basic clock signal and the second basic clock signal as a system clock signal, timing generating means for counting clock pulses of the system clock signal up to a predetermined numerical value thereby to generate a timing signal, request generating means for outputting an interrupt request signal in synchronism with one of either a positive-going edge or a negative-going edge of the second basic clock signal, interval measuring means for measuring an interval at which two interrupt request signals are inputted, with the system clock signal when the first basic clock signal is selected as the system clock signal, and count correcting means for correcting the predetermined numerical value based on the measured interval when the second basic clock signal is selected as the system clock signal.

With the second aspect of the present invention, as described above, the second basic clock signal is measured with the first basic clock signal, and the predetermined numerical value up to which the clock pulses are counted is corrected when the second basic clock signal is selected as the system clock signal. Even when the second basic clock signal varies from an ideal value therefor, the time required to count the clock pulses up to the predetermined numerical value can be corrected at the ideal value. Furthermore, since the interval between interrupt request signals each in synchronism with a positive-going edge or a negative-going edge of the second basic clock signal is measured with the first basic clock signal, the second basic clock signal can simply be measured with the first basic clock signal.

The count correcting means may comprise means for multiplying the predetermined numerical value by a corrective coefficient produced by dividing an ideal value for the second basic clock signal by an actually measured value of the second basic clock signal.

Because the predetermined numerical value is multiplied by the corrective coefficient when the second basic clock signal is selected as the system clock signal, even when the second basic clock signal varies from an ideal value therefor, the time required to count the clock pulses up to the predetermined numerical value can be corrected at the ideal value.

According to a third aspect of the present invention, there is provided an apparatus for processing data, comprising first clock generating means for generating a first basic clock signal, second clock generating means for generating a second basic clock signal lower in frequency than the first basic clock signal, clock selecting means for selectively outputting the first basic clock signal and the second basic clock signal as a system clock signal, timing generating means for counting clock pulses of the system clock signal up to a predetermined numerical value thereby to generate a timing signal, clock frequency-dividing means for frequency-dividing the second basic clock signal into "1/n" thereby to produce a frequency-divided clock signal, request generating means for outputting an interrupt request signal in synchronism with one of either a positive-going edge or a negative-going edge of the frequency-divided clock signal, interval measuring means for measuring an interval at which two interrupt request signals are inputted, with the system clock signal when the first basic clock signal is selected as the system clock signal, and count correcting means for correcting the predetermined numerical value based on the measured interval when the second basic clock signal is selected as the system clock signal.

With the third aspect of the present invention, as described above, the second basic clock signal is measured with the first basic clock signal, and the predetermined numerical value up to which the clock pulses are counted is corrected when the second basic clock signal is selected as the system clock signal. Even when the second basic clock signal varies from an ideal value therefor, the time required to count the clock pulses up to the predetermined numerical value can be corrected at the ideal value. Furthermore, since the interval between interrupt request signals each in synchronism with a positive-going edge or a negative-going edge of the frequency-divided clock signal generated from the second basic clock signal is measured with the first basic clock signal, the second basic clock signal can simply be measured with the first basic clock signal. Inasmuch as the second basic clock signal measured with the first basic clock signal is frequency-divided into "1/n", the second basic clock signal can be measured more accurately.

The count correcting means may comprise means for multiplying the predetermined numerical value by a corrective coefficient produced by dividing an ideal value for the second basic clock signal by a numerical value which is n times the measured interval.

Since the predetermined numerical value up to which the clock pulses are counted when the second basic clock signal is selected as the system clock signal is multiplied by the corrective coefficient, even when the second basic clock signal varies from an ideal value therefor, the time required to count the clock pulses up to the predetermined numerical value can be corrected at the ideal value. The second basic clock signal is frequency-divided into "1/n" and measured, and the corrective coefficient is calculated so as to depend upon n times the measured value, the corrective coefficient can be calculated more accurately.

According to a fourth aspect of the present invention, there is provided a method of generating a signal by generating a first basic clock signal with first clock generating means, generating a second basic clock signal lower in frequency than the first basic clock signal with second clock generating means, selectively outputting the first basic clock signal and the second basic clock signal as a system clock signal from clock selecting means, and counting clock pulses of the system clock signal up to a predetermined numerical value thereby to generate a timing signal with timing generating means, the method comprising the steps of measuring the second basic clock signal with the system clock when the first basic clock signal is selected as the system clock signal, and correcting the predetermined numerical value based on the measured second basic clock signal when the second basic clock signal is selected as the system clock signal.

With the fourth aspect of the present invention, as described above, the second basic clock signal is measured with the first basic clock signal, and the predetermined numerical value up to which the clock pulses are counted is corrected when the second basic clock signal is selected as the system clock signal. Even when the second basic clock signal varies from an ideal value therefor, the time required to count the clock pulses up to the predetermined numerical value can be corrected at the ideal value.

According to a fifth aspect of the present invention, there is provided a method of generating a signal by generating a first basic clock signal with first clock generating means, generating a second basic clock signal lower in frequency than the first basic clock signal with second clock generating means, selectively outputting the first basic clock signal and the second basic clock signal as a system clock signal from clock selecting means, and counting clock pulses of the system clock signal up to a predetermined numerical value thereby to generate a timing signal with timing generating means, the method comprising the steps of outputting an interrupt request signal in synchronism with one of either a positive-going edge or a negative-going edge of the second basic clock signal, measuring an interval at which two interrupt request signals are inputted, with the system clock signal when the first basic clock signal is selected as the system clock signal, and correcting the predetermined numerical value based on the measured interval when the second basic clock signal is selected as the system clock signal.

With the fifth aspect of the present invention, as described above, the second basic clock signal is measured with the first basic clock signal, and the predetermined numerical value up to which the clock pulses are counted is corrected when the second basic clock signal is selected as the system clock signal. Even when the second basic clock signal varies from an ideal value therefor, the time required to count the clock pulses up to the predetermined numerical value can be corrected at the ideal value. Furthermore, since the interval between interrupt request signals each in synchronism with a positive-going edge or a negative-going edge of the second basic clock signal is measured with the first basic clock signal, the second basic clock signal can simply be measured with the first basic clock signal.

According to a sixth aspect of the present invention, there is provided a method of generating a signal by generating a first basic clock signal with first clock generating means, generating a second basic clock signal lower in frequency than the first basic clock signal with second clock generating means, selectively outputting the first basic clock signal and the second basic clock signal as a system clock signal from clock selecting means, and counting clock pulses of the system clock signal up to a predetermined numerical value thereby to generate a timing signal with timing generating means, the method comprising the steps of frequency-dividing the second basic clock signal into "1/n" thereby to produce a frequency-divided clock signal, generating an interrupt request signal in synchronism with one of either a positive-going edge or a negative-going edge of the frequency-divided clock signal, measuring an interval at which two interrupt request signals are inputted, with the system clock signal when the first basic clock signal is selected as the system clock signal, and correcting the predetermined numerical value based on the measured interval when the second basic clock signal is selected as the system clock signal.

With the sixth aspect of the present invention, as described above, the second basic clock signal is measured with the first basic clock signal, and the predetermined numerical value up to which the clock pulses are counted is corrected when the second basic clock signal is selected as the system clock signal. Even when the second basic clock signal varies from an ideal value therefor, the time required to count the clock pulses up to the predetermined numerical value can be corrected at the ideal value. Furthermore, since the interval between interrupt request signals each in synchronism with a positive-going edge or a negative-going edge of the frequency-divided clock signal generated from the second basic clock signal is measured with the first basic clock signal, the second basic clock signal can simply be measured with the first basic clock signal. Inasmuch as the second basic clock signal measured with the first basic clock signal is frequency-divided into "1/n", the second basic clock signal can be measured more accurately.

The above and other objects, features, and advantages of the present invention will become apparent from the following description with references to the accompanying drawings which illustrate examples of the present invention.

DETAILED DESCRIPTION OF THE PREFERRED EMBODIMENTS

A data processing apparatus according to a first embodiment of the present invention will be described below with reference to FIGS. 2 through 7.

Figure 1:
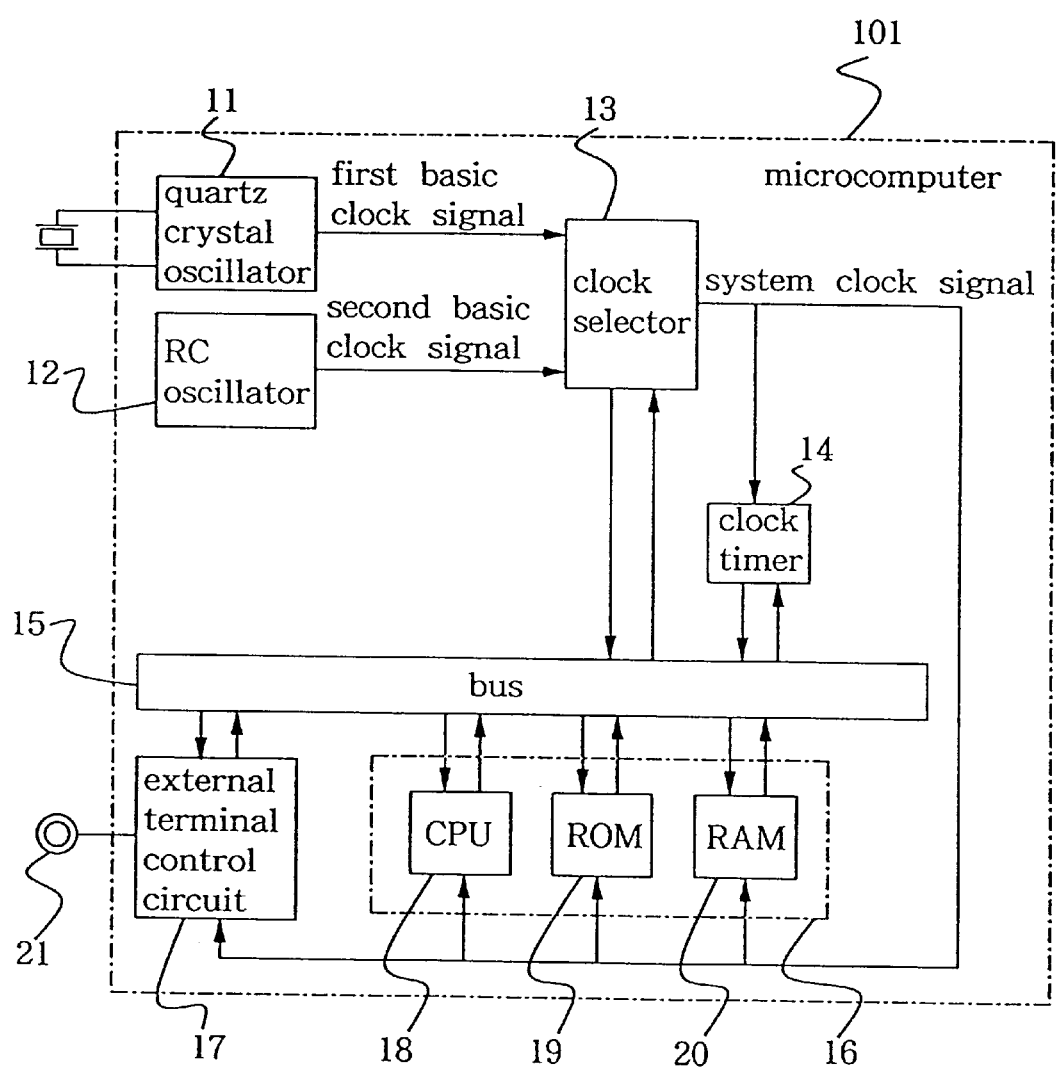
FIG. 1 is a block diagram of a conventional data processing apparatus.

Those parts shown in FIG. 2 which are identical to those shown in FIG. 1 are denoted by identical reference numerals and will not be described in detail below.

Figure 2:
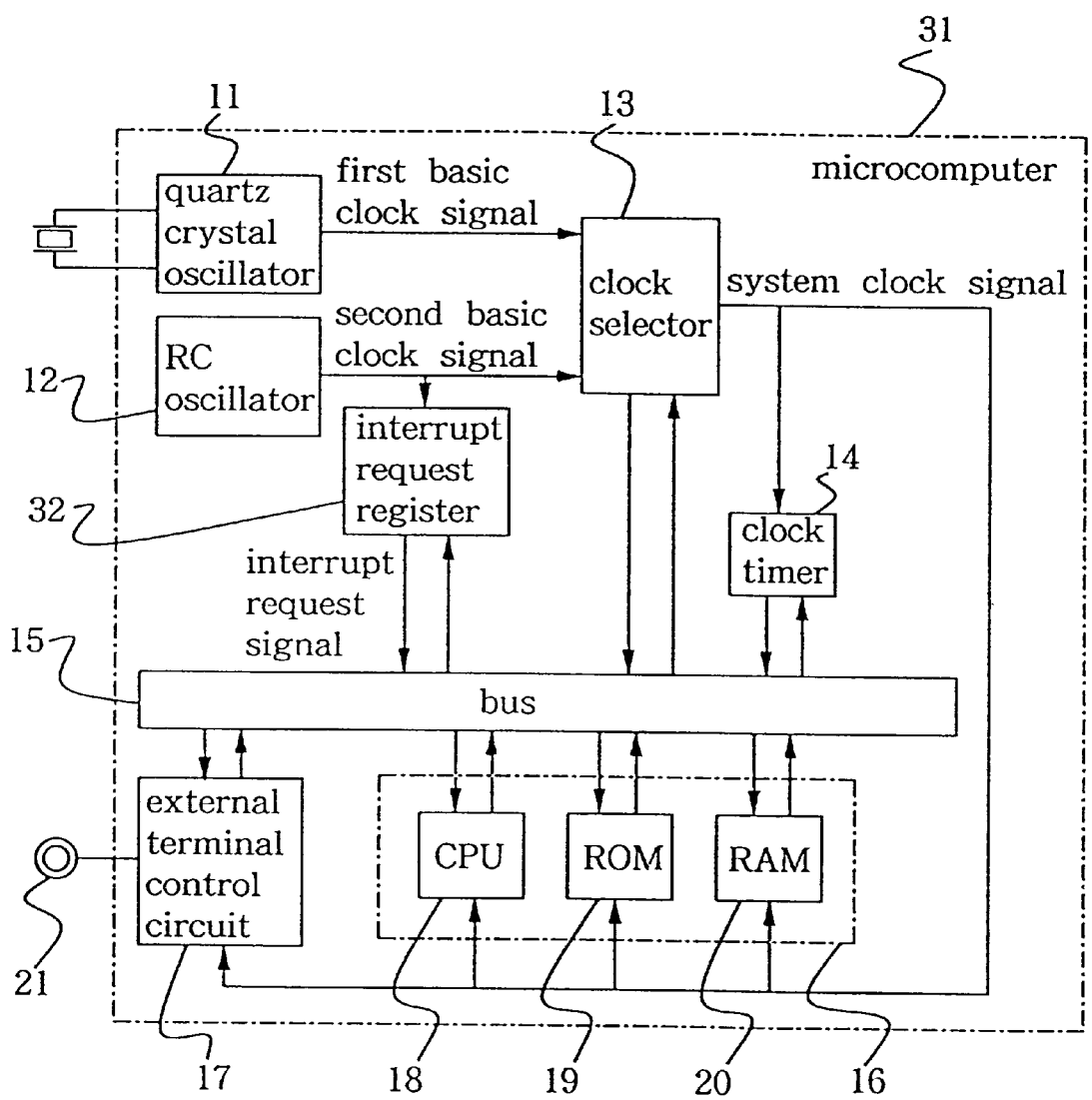
FIG. 2 is a block diagram of a physical structure of a data processing apparatus according to a first embodiment of the present invention.
Figure 3:
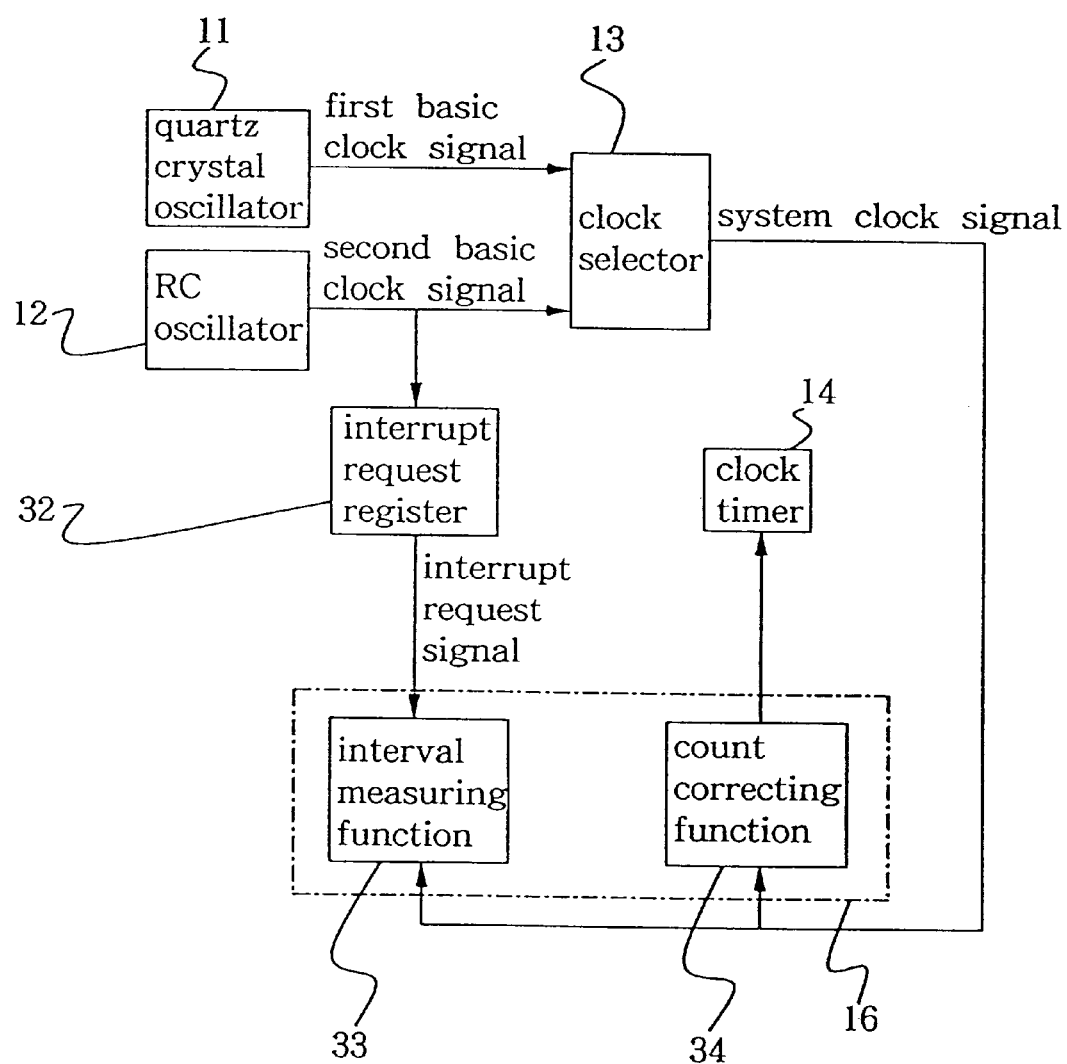
FIG. 3 is a block diagram of a logic structure of the data processing apparatus according to the first embodiment.

FIG. 2 shows in block form a physical structure of the data processing apparatus according to the first embodiment, and FIG. 3 shows in block form a logic structure of the data processing apparatus according to the first embodiment.

As shown in FIG. 2, the data processing apparatus according to the first embodiment comprises a microcontroller 31 which physically has a quartz-crystal oscillator 11 as a first clock generating means, an RC oscillator 12 as a second clock generating means, a clock selector 13 as a clock selecting means, a clock timer 14 as a timing generating means, a bus 15, a data processing circuit 16 as a data processing means, and an external terminal control circuit 17.

The microcontroller 31 additionally has an interrupt request register 32 serving as a request generating means and connected between the RC oscillator 12 and the data processing circuit 16. The interrupt request register 32 generates an interrupt request signal (see FIG. 4(c)) in synchronism with a positive-going edge of the second basic clock signal generated by the RC oscillator 12. The data processing circuit 16, which has the same physical structure as the data processing circuit 16 shown in FIG. 1, has a control program stored in the ROM 19 that is different from the control program stored in the ROM 19 of the data processing circuit 16 shown in FIG. 1.

When the CPU 18 reads and runs the control program stored in the ROM 19, the microcontroller 31 performs various functions which are illustrated as various means in FIG. 3. Those functions include an interval measuring function 33 as an interval measuring means and a count correcting function 34 as a count correcting means which are logically provided in the data processing circuit 16.

When the first basic clock signal (see FIG. 4(a)) is selected as the system clock signal, the interval measuring function 33 measures an interval at which two interrupt request signals are inputted, with the system clock signal under the control of the CPU 18 which operates according to the control program read from the ROM 19.

When the second basic clock signal (see FIG. 4(b)) is selected as the system clock signal, the count correcting function 34 corrects a numerical value counted by the clock timer 14 based on the interval measured by the interval measuring function 33 under the control of the CPU 18 which operates according to the control program read from the ROM 19.

Specifically, the count correcting function 34 divides an ideal value registered in advance for the second basic clock signal by the interval actually measured by the interval measuring function 33, thereby calculating a corrective coefficient, and multiplies the numerical value counted by the clock timer 14 by the corrective coefficient.

A process of generating a signal with the microcontroller 31 will be described below with reference to FIGS. 4 through 7.

Figure 5:
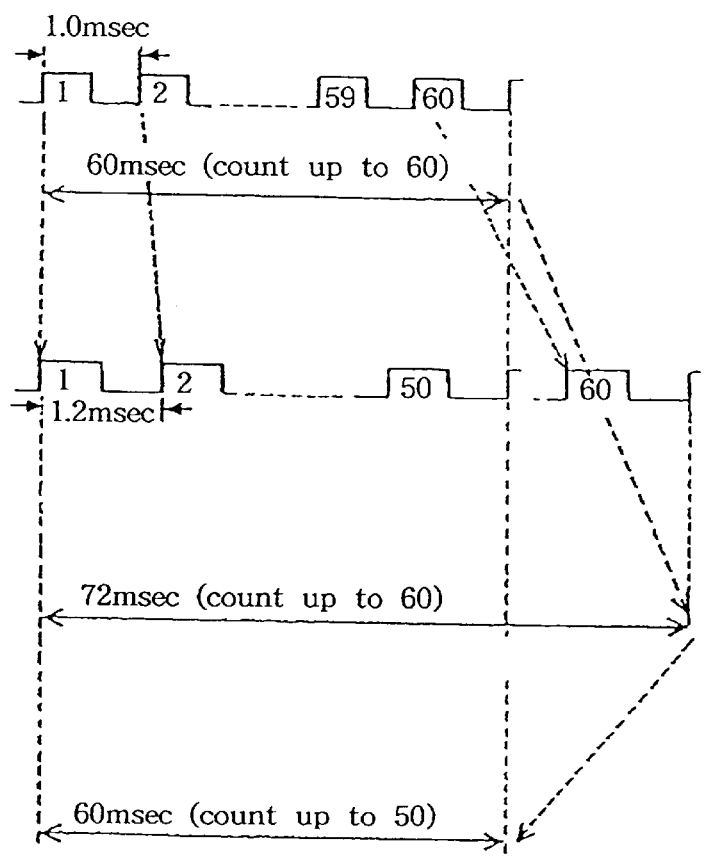
FIGS. 5(a) through 5(e) are a timing chart showing the relationship between ideal and measured values of the second basic clock signal and a corrected count time.
Figure 6:
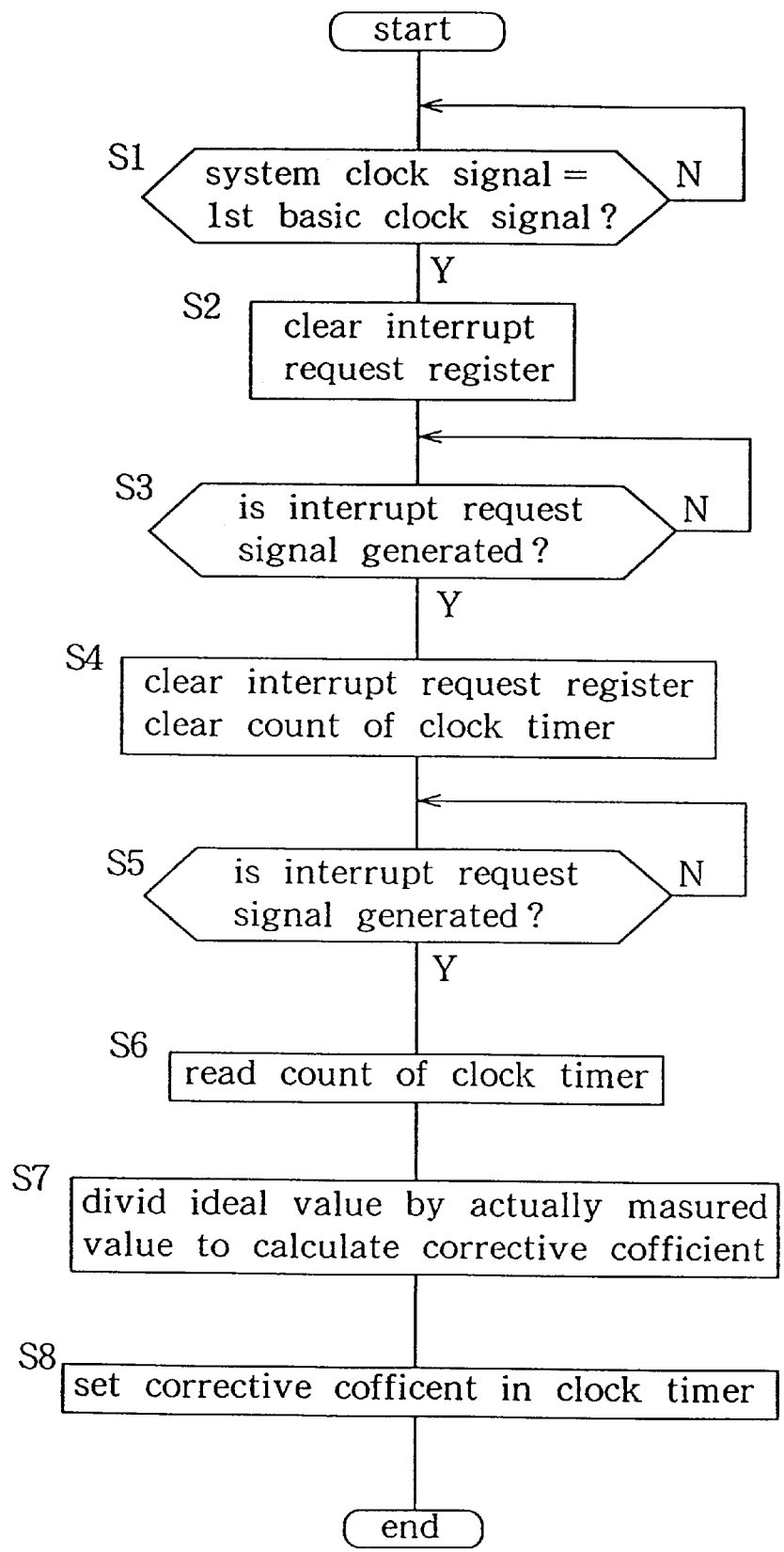
FIG. 6 is a flowchart of an operation sequence for establishing a corrective coefficient for a clock timer.
Figure 7:
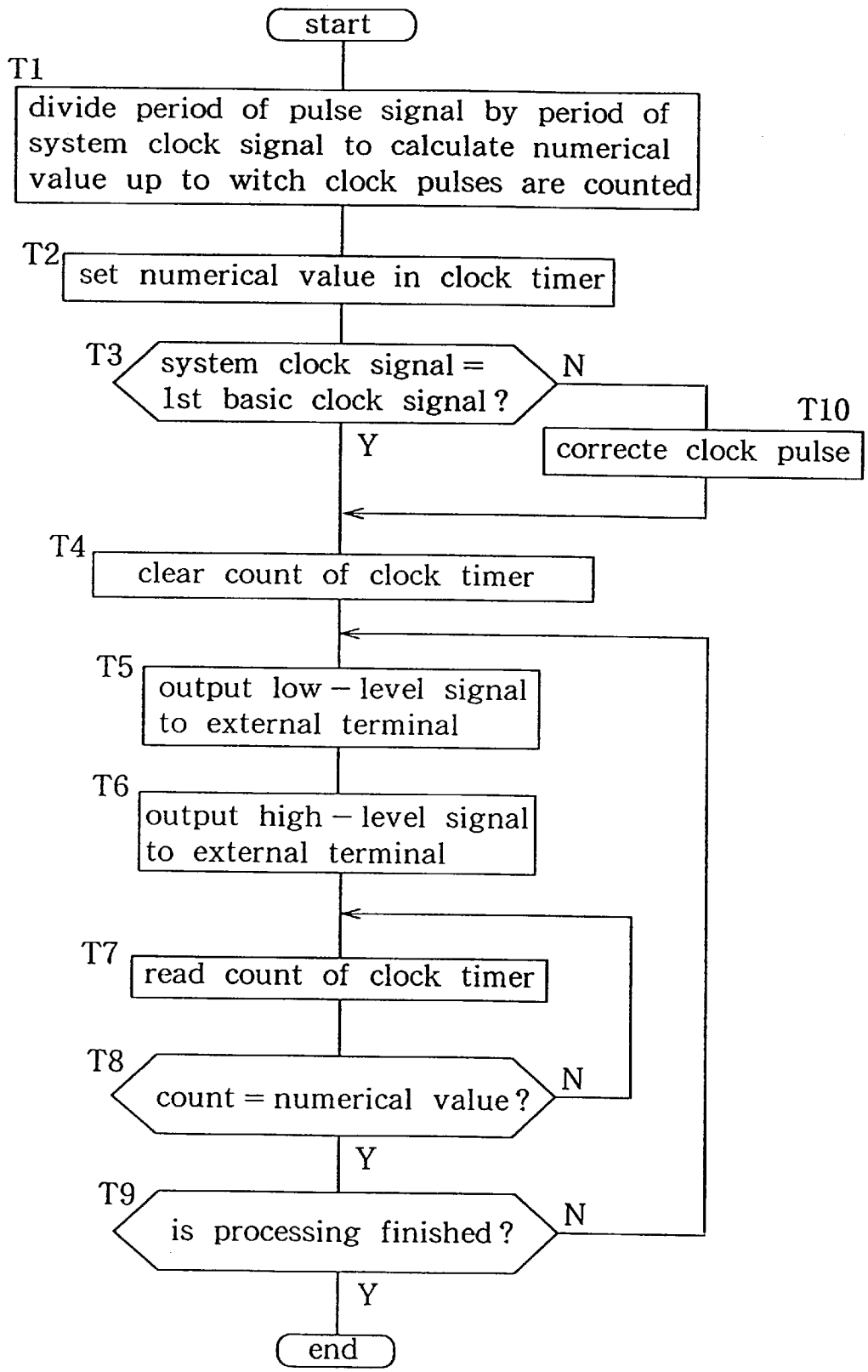
FIG. 7 is a flowchart of an operation sequence for outputting a pulse signal as a timing signal.

FIGS. 4(a) through 4(c) show the relationship between the first basic clock signal, the second basic clock signal, and the interrupt request signal. FIGS. 5(a) through 5(e) show the relationship between ideal and measured values of the second basic clock signal and a corrected count time. FIG. 6 illustrates an operation sequence carried out by the data processing circuit 16 for establishing the corrective coefficient for the clock timer 14. FIG. 7 illustrates an operation sequence carried out by the data processing circuit 16 for outputting a pulse signal as a timing signal.

Either the first or the second basic clock signal generated respectively by the quartz-crystal oscillator 11 and the RC oscillator 12 is selected by the clock selector 13, and clock pulses of the selected basic clock signal are counted up to a predetermined numerical value by the clock timer 14. The microcontroller 31 is thus capable of generating pulse signals having various frequencies as timing signals.

For example, if the microcontroller 31 is to output a pulse signal having a period of 60 msec. to the external terminal 21, when the first basic clock signal whose period is 1 (sec. is selected as the system clock signal, clock pulses of the first basic clock signal are counted up to 60000 by the clock timer 14. When the second basic clock signal whose period is 1 msec is selected as the system clock signal, clock pulses of the second basic clock signal are counted up to 60 by the clock timer 14, as shown in FIGS. 5(a) and 5(b).

If the period of the second basic clock signal generated by the RC oscillator 12 varies from an ideal value of 1.0 msec. to 1.2 msec., then the period of the pulse signal produced by counting clock pulses of the second basic clock signal up to 60 increases from 60 msec. to 72 msec., as shown in FIG. 5(c).

To solve the above problem, when the first basic clock signal is selected as the system clock signal, the microcontroller 31 measures the period of the second basic clock signal, and corrects, with the measured period, a numerical value counted when the second basic clock signal is selected as the system clock signal.

More specifically, processing operation of the data processing circuit 16, which corrects a numerical value counted when the second basic clock signal is selected as the system clock signal, is carried out when the first basic clock signal is selected as the system clock signal.

As shown in FIG. 6, the data processing circuit 16 first recognizes the system clock signal as the first basic clock signal in a step S1.

Then, the data processing circuit 16 clears the interrupt request register 32 in a step S2. Since a positive-going edge of the second basic clock signal can be detected, the data processing circuit 16 monitors the generation of a first interrupt request signal in a step S3. If the generation of a first interrupt request signal is detected, then the data processing circuit 16 clears the interrupt request register 32 and the clock timer 14 in a step S4.

Inasmuch as a period of the second basic clock signal can be measured with the first basic clock signal, the data processing circuit 16 monitors the generation of a second interrupt request signal in a step S5. If the generation of a second interrupt request signal is detected, then the data processing circuit 16 reads a count from the clock timer 14 in a step S6.

The count thus read is representative of the period of the second basic clock signal as measured with the first basic clock signal, the data processing circuit 16 divides an ideal value for the second basic clock signal by the measured period, thus calculating a corrective coefficient for the clock timer 14 in a step S7.

For example, if an ideal value for a period of the second basic clock signal is 1.0 msec and an actual value of the period thereof is 1.2 msec., then the corrective coefficient for the clock timer 14 is calculated as "1/1.2". The calculated corrective coefficient is then set in the clock timer 14 in a step S8. The calculated corrective coefficient is subsequently used to multiply a numerical value up to which clock pulses of the second basic clock signal as the system clock signal are counted by the clock timer 14.

Figure 4:
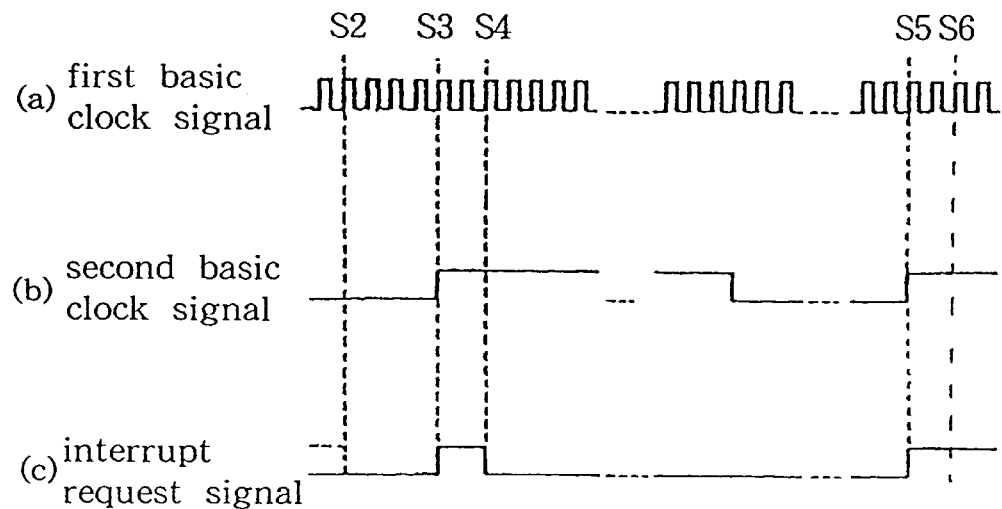
FIGS. 4(a) through 4(c) are a timing chart showing the relationship between a first basic clock signal, a second basic clock signal, and interrupt request signals.

The first basic clock signal, the second basic clock signal, and interrupt request signals in the above process are shown in FIGS. 4(*a*) through 4(*c*). There is a time lag present from the detection of a first interrupt request signal to the clearing of the clock timer 14 (S3–S4). Since the same time lag is present from the detection of a second interrupt request signal to the reading of the count from the clock timer 14 (S5–S6), a period (S4–S6) of the second basic clock signal is accurately measured with the first basic clock signal.

A process carried out by the data processing circuit 16 for the microcontroller 31 to count clock pulses of the system clock signal and output a pulse signal will be described below with reference to FIG. 7. The data processing circuit 16 divides the period of a pulse signal inputted from the external terminal 21 by the period of the system clock signal for thereby calculating a numerical value up to which clock pulses are counted by the clock timer 14 in a step T1.

The data processing circuit 16 then sets the calculated numerical value in the clock timer 14 in a step T2. For example, if the period of the pulse signal is 60 msec., then when the first basic clock signal whose period is 1 (sec. is selected as the system clock signal, the data processing circuit 16 calculates 60000 as a numerical value up to which clock pulses are counted by the clock timer 14. When the second basic clock signal whose period is 1 msec. is selected as the system clock signal, the data processing circuit 16 calculates 60 as a numerical value up to which clock pulses are counted by the clock timer 14.

If the first basic clock signal is selected as the system clock signal in a step T3, then the data processing circuit 16 clears the count of the clock timer 14 in a step T4, and then outputs low- and high-level signals successively to the external terminal 21 in steps T5, T6.

The data processing circuit 16 repeatedly reads a count of the clock timer 14 until it reaches the preset numerical value in steps T7, T8. When the count of the clock timer 14 reaches the preset numerical value, the data processing circuit 16 outputs low- and high-level signals successively to the external terminal 21 in the steps T5, T6.

For example, if the first basic clock signal whose period is 1 (sec. is selected as the system clock signal and the numerical value up to which clock pulses are counted by the clock timer 14 is set to 60000, then since the high-level output signal goes low in level in every 60000 msec., it is outputted as a pulse signal whose period is 60 msec.

If the second basic clock signal is selected as the system clock signal, then the pulse signal is basically outputted as described above, but the numerical value up to which clock pulses are counted by the clock timer 14 is multiplied by the corrective coefficient. Specifically, if it is confirmed that the second basic clock signal is selected as the system clock signal in the step T3, then the numerical value up to which clock pulses are counted by the clock timer 14 is corrected by being multiplied by the corrective coefficient in a step T10.

For example, for outputting a pulse signal whose period is 60 msec., if the second basic clock signal whose period is 1 msec. is selected as the system clock signal, the numerical value up to which clock pulses are counted by the clock timer 14 is set to 60. If the period of the second basic clock signal varies from an ideal value of 1 msec. to 1.2 msec., then the numerical value of 60 is multiplied by the corrective coefficient of "1/1.2", thereby calculating a numerical value of 50, as shown in FIG. 5(*e*).

When the clock timer 14 counts clock pulses of the second basic clock signal whose period is 1.2 msec. up to 50, the output signal changes from a high level to a low level. Therefore, the output signal is outputted as a pulse signal whose period is 60 msec.

Even when the period of the second basic clock signal generated by the RC oscillator 12 varies from an ideal value, the microcontroller 31 corrects the numerical value up to which clock pulses are counted by the clock timer 14, and hence can output a pulse signal having a desired period.

Inasmuch as the ideal value is divided by the actually measured period of the second basic clock signal to calculate a corrective coefficient and the numerical value up to which clock pulses are counted by the clock timer 14 is corrected by the calculated corrective coefficient, the microcontroller 31 can accurately generate and output pulse signals having various periods.

The second basic clock signal can simply be measured with the first basic clock signal because an interval at which two interrupt request signals are inputted in synchronism with positive-going edges of the second basic clock signal is measured with the first basic clock signal.

The data processing apparatus according to the first embodiment only has the interrupt request register 32 as additional hardware compared with the conventional data processing apparatus. Therefore, the data processing apparatus according to the first embodiment is capable of accurately outputting pulse signals with a relatively simple structure.

The interrupt request register 32 may comprise a latch circuit such as a single flip-flop for setting an interrupt request signal in synchronism with a positive-going edge of the basic clock signal.

In the first embodiment, the interval measuring function 33 for measuring an interval between interrupt request signals with the first basic clock signal and the count correcting function 34 for calculating and setting a corrective coefficient in the clock timer 14 are software-implemented by the data processing circuit 16. However, the interval measuring function 33 and the count correcting function 34 may be hardware-implemented.

Figure 8:
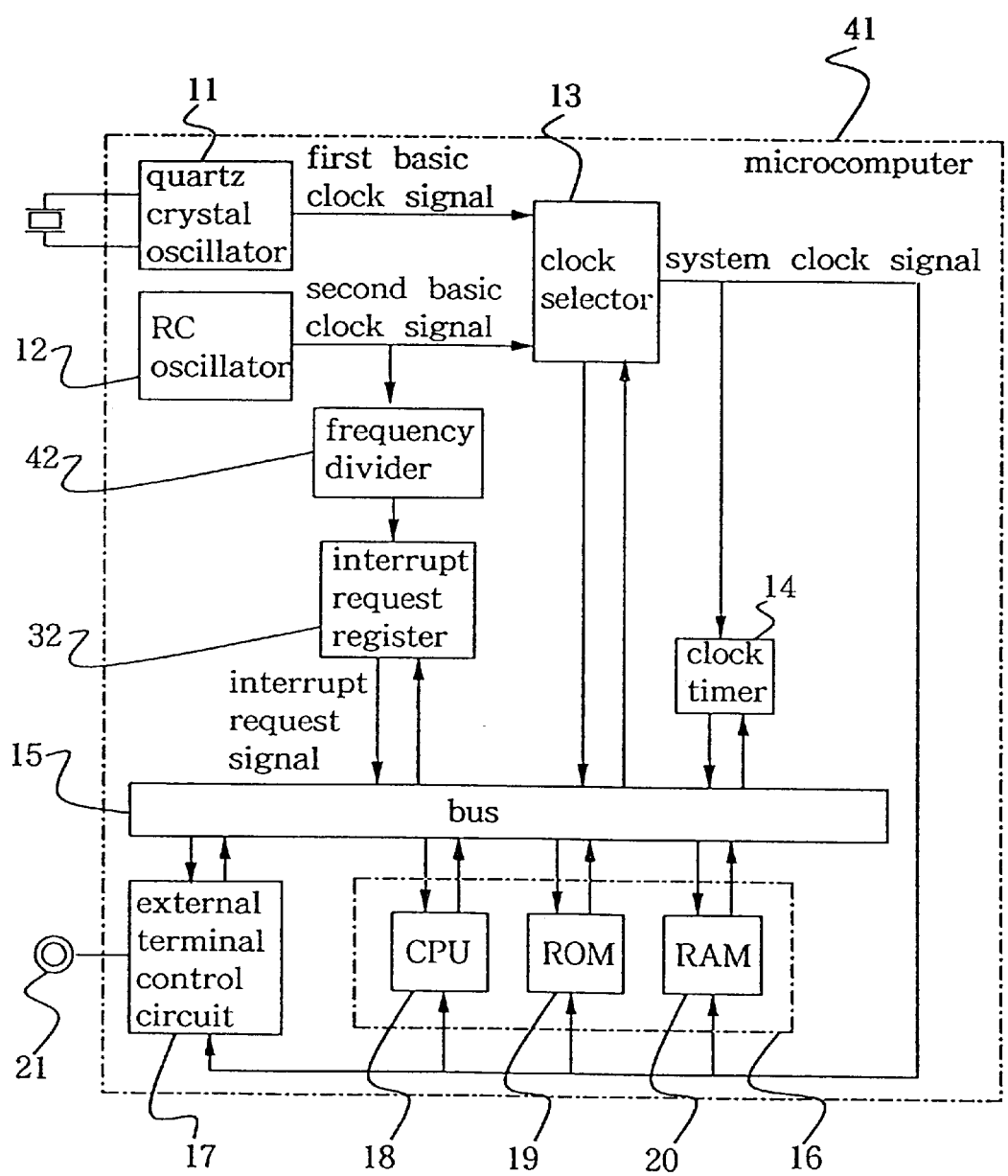
FIG. 8 is a block diagram of a physical structure of a data processing apparatus according to a second embodiment of the present invention.

A data processing apparatus according to a second embodiment of the present invention will be described below. FIG. 8 shows in block form a physical structure of the data processing apparatus according to the second embodiment of the present invention.

As shown in FIG. 8, the data processing apparatus according to the second embodiment comprises a microcontroller 41 which physically differs from the microcontroller 31 shown in FIG. 2 in that it additionally has a frequency divider 42 serving as a clock frequency-dividing means and connected between the RC oscillator 12 and the interrupt request register 32. The frequency divider 42 divides the frequency of the second basic clock signal into a frequency of "1/n".

The control program stored as software in the ROM 19 of the data processing circuit 16 shown in FIG. 8 partly differs from the control program of the microcontroller 31 shown in FIG. 2. The count correcting function 34 of the microcontroller 41 divides a ideal value registered in advance for the period of the second basic clock signal by a numerical value which is n times the actually measured period for thereby calculating a corrective coefficient.

When the microcontroller 41 measures the second basic clock signal with the first basic clock signal selected as the system clock signal, the second basic clock signal is frequency-divided into "1/n" by the frequency divider 42. Therefore, the microcontroller 41 can measure the second basic clock signal more accurately.

Therefore, when the second basic clock signal is selected as the system clock signal, the microcontroller 41 can correct more accurately a numerical value up to which clock pulses are counted by the clock timer 14, and hence can output pulse signals having desired periods.

It is to be understood that variations and modifications of the cross-connection devices disclosed herein will be evident to those skilled in the art. It is intended that all such modifications and variations be included within the scope of the appended claims.

What is claimed is:

1. An apparatus for processing data, comprising:
   first clock generating means for generating a first basic clock signal;
   second clock generating means for generating a second basic clock signal lower in frequency than said first basic clock signal;
   clock selecting means for selectively outputting either said first basic clock signal or said second basic clock signal as a system clock signal;
   timing generating means for counting clock pulses of said system clock signal up to a predetermined numerical value thereby to generate a timing signal; and
   data processing means for measuring said second basic clock signal with the system clock when said first basic clock signal is selected as the system clock signal, and correcting said predetermined numerical value based on the measured second basic clock signal when said second basic clock signal is selected as the system clock signal.

2. An apparatus for processing data, comprising:
   first clock generating means for generating a first basic clock signal;
   second clock generating means for generating a second basic clock signal lower in frequency than said first basic clock signal;
   clock selecting means for selectively outputting either said first basic clock signal or said second basic clock signal as a system clock signal;
   timing generating means for counting clock pulses of said system clock signal up to a predetermined numerical value thereby to generate a timing signal;
   request generating means for outputting an interrupt request signal in synchronism with one of either a positive-going edge or a negative-going edge of said second basic clock signal;
   interval measuring means for measuring an interval at which two interrupt request signals are inputted, with said system clock signal when said first basic clock signal is selected as said system clock signal; and
   count correcting means for correcting said predetermined numerical value based on the measured interval when said second basic clock signal is selected as the system clock signal.

3. An apparatus according to claim 2, wherein said count correcting means comprises means for multiplying said predetermined numerical value by a corrective coefficient produced by dividing an ideal value for said second basic clock signal by an actually measured value of said second basic clock signal.

4. An apparatus for processing data, comprising:
   first clock generating means for generating a first basic clock signal;
   second clock generating means for generating a second basic clock signal lower in frequency than said first basic clock signal;
   clock selecting means for selectively outputting either said first basic clock signal or said second basic clock signal as a system clock signal;
   timing generating means for counting clock pulses of said system clock signal up to a predetermined numerical value thereby to generate a timing signal;
   clock frequency-dividing means for frequency-dividing said second basic clock signal into "1/n" thereby to produce a frequency-divided clock signal;
   request generating means for outputting an interrupt request signal in synchronism with one of either a positive-going edge or a negative-going edge of said frequency-divided clock signal;
   interval measuring means for measuring an interval at which two interrupt request signals are inputted, with said system clock signal when said first basic clock signal is selected as said system clock signal; and
   count correcting means for correcting said predetermined numerical value based on the measured interval when said second basic clock signal is selected as the system clock signal.

5. An apparatus according to claim 4, wherein said count correcting means comprises means for multiplying said predetermined numerical value by a corrective coefficient produced by dividing an ideal value for said second basic clock signal by a numerical value which is n times the measured interval.

6. A method of generating a signal by generating a first basic clock signal with first clock generating means, generating a second basic clock signal lower in frequency than said first basic clock signal with second clock generating means, selectively outputting either said first basic clock signal or said second basic clock signal as a system clock signal from clock selecting means, and counting clock pulses of said system clock signal up to a predetermined numerical value thereby to generate a timing signal with timing generating means, said method comprising the steps of:

measuring said second basic clock signal with the system clock when said first basic clock signal is selected as the system clock signal; and correcting said predetermined numerical value based on the measured second basic clock signal when said second basic clock signal is selected as the system clock signal.

7. A method of generating a signal by generating a first basic clock signal with first clock generating means, generating a second basic clock signal lower in frequency than said first basic clock signal with second clock generating means, selectively outputting either said first basic clock signal or said second basic clock signal as a system clock signal from clock selecting means, and counting clock pulses of said system clock signal up to a predetermined numerical value thereby to generate a timing signal with timing generating means, said method comprising the steps of:

outputting an interrupt request signal in synchronism with one of either a positive-going edge or a negative-going edge of said second basic clock signal;

measuring an interval at which two interrupt request signals are inputted, with said system clock signal when said first basic clock signal is selected as said system clock signal; and correcting said predetermined numerical value based on the measured interval when said second basic clock signal is selected as the system clock signal.

8. A method of generating a signal by generating a first basic clock signal with first clock generating means, generating a second basic clock signal lower in frequency than said first basic clock signal with second clock generating means, selectively outputting either said first basic clock signal or said second basic clock signal as a system clock signal from clock selecting means, and counting clock pulses of said system clock signal up to a predetermined numerical value thereby to generate a timing signal with timing generating means, said method comprising the steps of:

frequency-dividing said second basic clock signal into "1/n" thereby to produce a frequency-divided clock signal;

generating an interrupt request signal in synchronism with one of either a positive-going edge or a negative-going edge of said frequency-divided clock signal;

measuring an interval at which two interrupt request signals are inputted, with said system clock signal when said first basic clock signal is selected as said system clock signal; and correcting said predetermined numerical value based on the measured interval when said second basic clock signal is selected as the system clock signal.

* * * * *